(12) United States Patent
Ando et al.

(10) Patent No.: US 10,048,671 B2
(45) Date of Patent: Aug. 14, 2018

(54) CONTROL DEVICE, CONTROL METHOD, AND CONTROL PROGRAM

(71) Applicants: TOYOTA JIDOSHA KABUSHIKI KAISHA, Toyota-shi, Aichi-ken (JP); SANYO MACHINE WORKS, LTD., Kitanagoya-shi, Aichi (JP)

(72) Inventors: Shiro Ando, Nissin (JP); Makoto Ashikaga, Nissin (JP); Masahiro Tasaka, Nissin (JP); Hisashi Ryota, Owariasahi (JP)

(73) Assignees: TOYOTA JIDOSHA KABUSHIKI KAISHA, Toyota-shi, Aichi-Ken (JP); SANYO MACHINE WORKS, LTD., Kitanagoya-shi, Aichi (JP)

( * ) Notice: Subject to any disclaimer, the term of this patent is extended or adjusted under 35 U.S.C. 154(b) by 342 days.

(21) Appl. No.: 14/893,782

(22) PCT Filed: May 20, 2014

(86) PCT No.: PCT/IB2014/000778
§ 371 (c)(1),
(2) Date: Nov. 24, 2015

(87) PCT Pub. No.: WO2014/191802
PCT Pub. Date: Dec. 4, 2014

(65) Prior Publication Data
US 2016/0116897 A1  Apr. 28, 2016

(30) Foreign Application Priority Data

May 27, 2013 (JP) .................................. 2013-110874

(51) Int. Cl.
*G05B 15/02* (2006.01)
*G05B 19/18* (2006.01)
(Continued)

(52) U.S. Cl.
CPC .......... *G05B 19/186* (2013.01); *B23P 19/066* (2013.01); *B25B 21/008* (2013.01);
(Continued)

(58) Field of Classification Search
CPC ..... B23P 19/066; B25B 21/008; B25B 21/02; B25B 23/1405; G05B 15/02; G05B 19/186; G05B 2219/37344
See application file for complete search history.

(56) References Cited

U.S. PATENT DOCUMENTS

| | | | | |
|---|---|---|---|---|
| 4,413,396 A | * | 11/1983 | Wallace | B23P 19/066 173/1 |
| 2008/0178713 A1 | * | 7/2008 | Long | B23P 19/066 81/467 |
| 2009/0014192 A1 | * | 1/2009 | Ito | B23P 19/066 173/1 |

FOREIGN PATENT DOCUMENTS

| | | |
|---|---|---|
| GB | 2441670 A | 3/2008 |
| JP | 64-064783 A | 3/1989 |

(Continued)

*Primary Examiner* — Yuhui R Pan
(74) *Attorney, Agent, or Firm* — Sughrue Mion, PLLC

(57) ABSTRACT

A control method according to an aspect of the invention includes a process for setting target fastening torque, a pulse interval of neighboring pulses, and an elevated value of torque per pulse, detecting last fastening torque at an Nth pulse (N is a natural number of 1 or more) after seating of a fastening member, setting pulse loading time at an N+1th pulse and pulse strength at the N+1th pulse based on the last fastening torque at the Nth pulse so that fastening torque at the N+1th pulse coincides with a multiple of the elevated value, controlling a fastening tool based on the pulse interval, the pulse loading time, and the pulse strength so that last fastening torque at an N+Mth pulse (M is a natural number of 1 or more) reaches target fastening torque.

3 Claims, 3 Drawing Sheets

(51) Int. Cl.
 *B25B 21/00* (2006.01)
 *B25B 21/02* (2006.01)
 *B25B 23/14* (2006.01)
 *B23P 19/06* (2006.01)

(52) U.S. Cl.
 CPC .......... *B25B 21/02* (2013.01); *B25B 23/1405* (2013.01); *G05B 15/02* (2013.01); *G05B 2219/37344* (2013.01)

(56) References Cited

FOREIGN PATENT DOCUMENTS

| | | | |
|---|---|---|---|
| JP | 06-079552 | A | 3/1994 |
| JP | 2000-326250 | A | 11/2000 |
| JP | 2005-254372 | A | 9/2005 |
| JP | 2006-110657 | A | 4/2006 |

* cited by examiner

US 10,048,671 B2

CONTROL DEVICE, CONTROL METHOD, AND CONTROL PROGRAM

BACKGROUND OF THE INVENTION

1. Field of the Invention

The invention relates to a control device, a control method, and a control program, and especially relates to a control device, a control method, and a control program of a fastening tool.

2. Description of Related Art

When fastening a fastening member such as a nut and a bolt by using a nut runner that is a representative example of a fastening tool, it is important to fasten the fastening member with given torque.

For example, Japanese Patent Application Publication No. 6-79552 (JP 6-79552 A) discloses a technology in which a rate of increase of torque per angle, which is set in advance on a torque curve, is measured continuously, and quality of plastic-region fastening of the bolt is determined based on a comparison between maximum torque measured in a fastening process and torque when the fastening is completed.

In general, when a fastening member is fastened by using a fastening tool, the fastening tool is controlled so as to follow a torque curve that is set by an empirical rule in advance. At that time, even for the same target fastening torque, characteristics of reaching the optimum target fastening torque are different depending on differences in rigidity of a fastened member (for example, a rigid body, an intermediate, and a soft body).

The technology described in JP 6-79552 A enables determination of quality of plastic-region fastening of a bolt, but is not able to deal with differences in rigidity of a fastened member. Therefore, there is a room remaining for an improvement of fastening accuracy.

SUMMARY OF THE INVENTION

The invention provides a control device, a control method, and a control program of a fastening tool, which contribute to an improvement of fastening accuracy.

A control method according to an aspect of the invention is a control method of a fastening tool that applies torque to a fastening member in a pulse-like fashion, which includes a function of setting target torque and a target number of pulses (target fastening pulse) in which fastening is desired to be completed after seating, or time in which fastening is desired to be completed after the seating (target fastening time), and previously setting a torque slope from the seating until completion (with respect to the number of pulses or time) linearly or as an arbitrary curve. In the fastening tool having a function of adjusting pulse strength for each of the pulses, pulse strength is adjusted in comparison with the previously-set torque slope based on fastening torque at the nearest pulse while fastening, and the number of pulses (fastening pulses) from the seating to the present time, or time from the seating to the present time (fastening time). In other words, a control method according to an aspect of the invention is a control method of a fastening tool that applies torque to a fastening member in a pulse-like fashion, the method includes a function of setting target fastening torque, a pulse interval of neighboring pulses, and an elevated value of torque per pulse, the method includes a function of detecting last fastening torque at an Nth pulse (N is a natural number of 1 or more) after abutment seating of the fastening member, the method includes a function of setting time for fastening the fastening member at an N+1th pulse, and a value obtained by subtracting the a product of the last fastening torque at the Nth pulse and the time for fastening the fastening member at the N+1th pulse, from an integrated value of torque applied to the fastening member at the N+1th pulse, based on the last fastening torque at the Nth pulse so that fastening torque at the N+1th pulse coincides with a multiple of the elevated value, and, the method includes a function of controlling the fastening tool based on the pulse interval, the time for fastening the fastening member at the N+1th pulse, the value obtained by subtracting the product of the last fastening torque at the Nth pulse and the time for fastening the fastening member at the N+1th pulse, from the integrated value of torque applied to the fastening member at the N+1th pulse, so as to allow last fastening torque at an N+Mth pulse (M is a natural number of 1 or more) to the target fastening torque.

In the foregoing control method, in a case where rigidity of a fastened member, to which the fastening member is fastened, is varied, and target fastening torque is the same, time for fastening the fastening member at an N+1th pulse, and a value obtained by subtracting the product of the last fastening torque at an Nth pulse and the time for fastening the fastening member at the N+1th pulse, from an integrated value of torque applied to the fastening member at the N+1th pulse, may be set so that time to reach the target fasting torque is equalized.

A control program according to an aspect of the invention is a control program of a fastening tool that applies torque to a fastening member in a pulse-like fashion, which causes a computer to execute processing for setting target fastening torque, a pulse interval of neighboring pulses, and an elevated value of torque per pulse, processing for detecting last fastening torque at an Nth pulse (N is a natural number of 1 or more) after seating of the fastening member, processing for setting time for fastening the fastening member at an N+1th pulse, and a value obtained by subtracting the product of the last fastening torque at the Nth pulse and the time for fastening the fastening member at the N+1th pulse, from an integrated value of torque applied to the fastening member at the N+1th pulse, based on the last fastening torque at the Nth pulse so that fastening torque at the N+1th pulse coincides with a multiple of the elevated value, and processing for controlling the fastening tool based on the pulse interval, the time for fastening the fastening member at the N+1th pulse, and the value obtained by subtracting the product of the last fastening torque at the Nth pulse and the time for fastening the fastening member at the N+1th pulse, from the integrated value of torque applied to the fastening member at the N+1th pulse, and allowing last fastening torque at an N+Mth pulse (M is a natural number of 1 or more) to reach the target fastening torque.

A control device according to an aspect of the invention is a control device of a fastening tool that applies torque to a fastening member in a pulse-like fashion, the control device comprises a control part. The control part is configured to set time for fastening the fastening member at an N+1th pulse, and a value obtained by subtracting the product of last fastening torque at an Nth pulse and the time for fastening the fastening member at the N+1th pulse, from an integrated value of torque applied to the fastening member at the N+1th pulse, based on the last fastening torque at an Nth pulse so that last fastening torque at the N+1th pulse coincides with a multiple of a previously-set elevated value of torque per pulse, and target fastening torque is reached with a previously-set pulse interval.

As explained so far, it is possible to provide a control device, a control method, and a control program of a fastening tool, which is able to contribute to an improvement of fastening accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The best mode for carrying out the invention is explained below with reference to the attached drawings. However, it does not mean that the present invention is limited to the following embodiment. In order to clarify the explanation, the description and drawings below are simplified as necessary.

Figure 1:
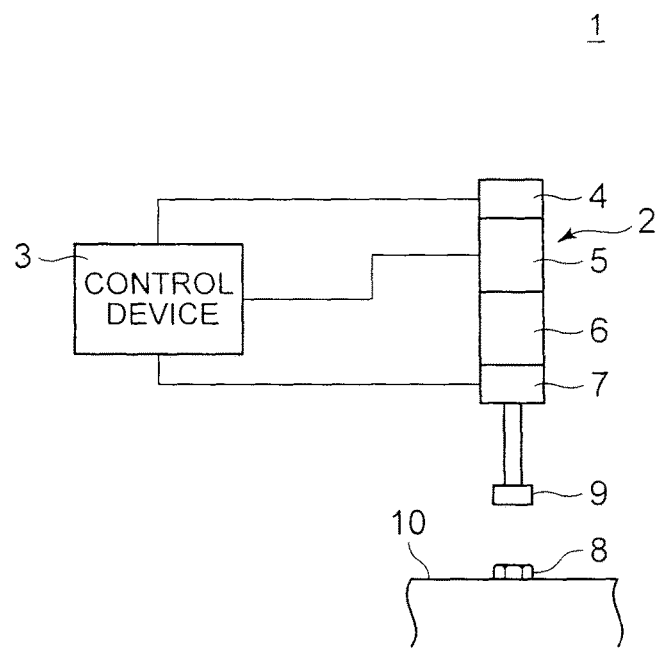
FIG. 1 is a view showing a common fastening system.

A control device, a control method, and a control program according to this embodiment is explained. First of all, a basic structure of a common fastening system is explained. FIG. 1 is a view showing a common fastening system.

As shown in FIG. 1, a fastening system 1 is provided with a fastening tool 2 and a control device 3. The fastening tool 2 includes an encoder 4, a driving motor 5, a speed reducer 6, and a torque sensor 7.

The encoder 4 detects a rotation angle of the driving motor 5, and outputs a detection signal to the control device 3. The driving motor 5 operates based on a control signal inputted from the control device 3. Rotational driving force of the driving motor 5 is outputted to the speed reducer 6.

The speed reducer 6 amplifies the rotational driving force inputted by the driving motor 5, and outputs the amplified rotational driving force from an output shaft. A socket 9 for fastening the fastening member 8 is fitted to the output shaft of the speed reducer 6. The torque sensor 7 detects torque applied by the socket 9 to the fastening member 8, and outputs a detection signal to the control device 3.

Figure 2:
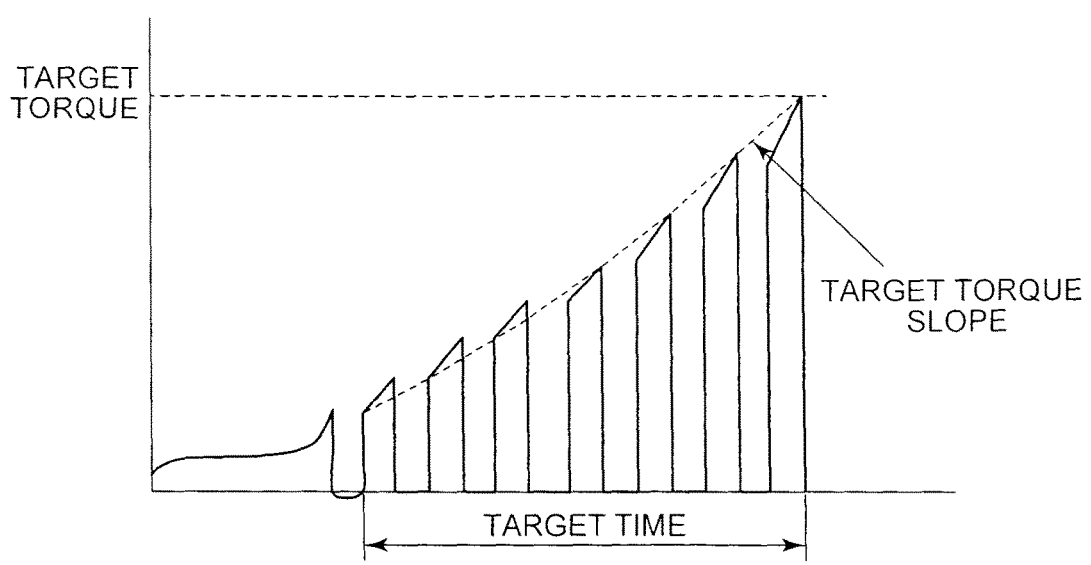
FIG. 2 is a view schematically showing a relation between torque applied to a common fastening member after the fastening member abuts on a fastened member, and time.

The control device 3 controls the driving motor 5 based on the detection signals inputted by the encoder 4 and the torque sensor 7. FIG. 2 is a view schematically showing a relation between torque applied to the common fastening member 8 after the fastening member 8 abuts on the fastened member 10, and time. As shown in FIG. 2, the control device 3 applies torque to the fastening member 8 in a pulse-like fashion, and causes fastening torque to reach a target fastening torque.

In the following explanation, "pulse loading time" is time from rising to falling of a pulse, which is, in short, time for fastening the fastening member 8 per pulse. "Torque strength" is a value obtained by subtracting the product of the pulse loading time and last fastening torque applied to the fastening member 8 in a previous pulse, from an integral value of torque applied to the fastening member 8 per pulse. "Torque interval" is time between neighboring pulses.

In general, in order to reduce reaction force from a fastening tool, the three elements of pulse loading time, torque strength, and a torque interval are set based on an empirical rule, and the control device controls a driving motor based on the settings. However, for such fastening control, it is necessary to change the settings in accordance with differences in rigidity of a fastened member. Therefore, the control device 3 according to this embodiment controls the driving motor 5 as stated below.

Figure 3:
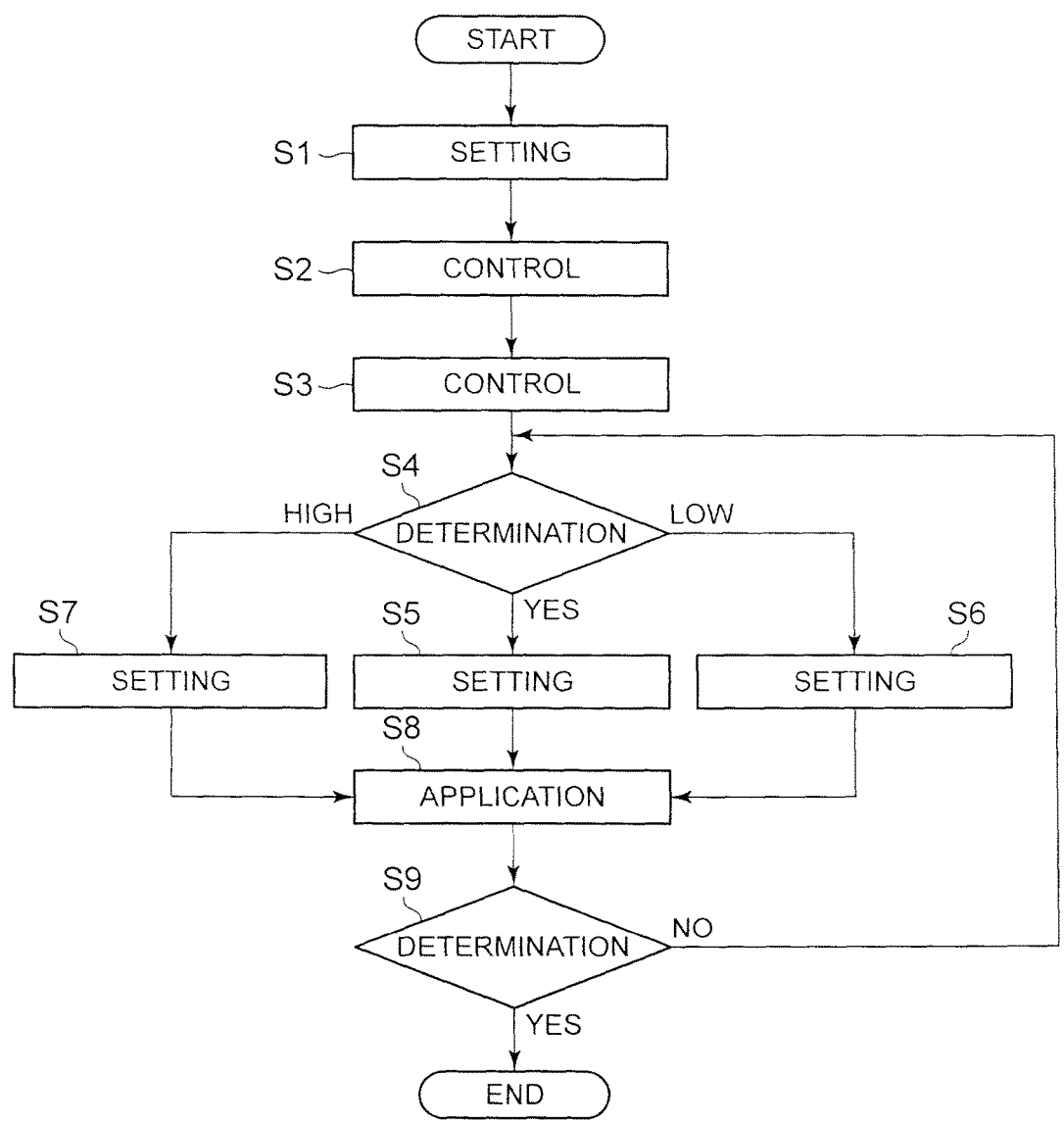
FIG. 3 is a view showing a control flow of a driving motor in a control device according to an embodiment.
Figure 4:
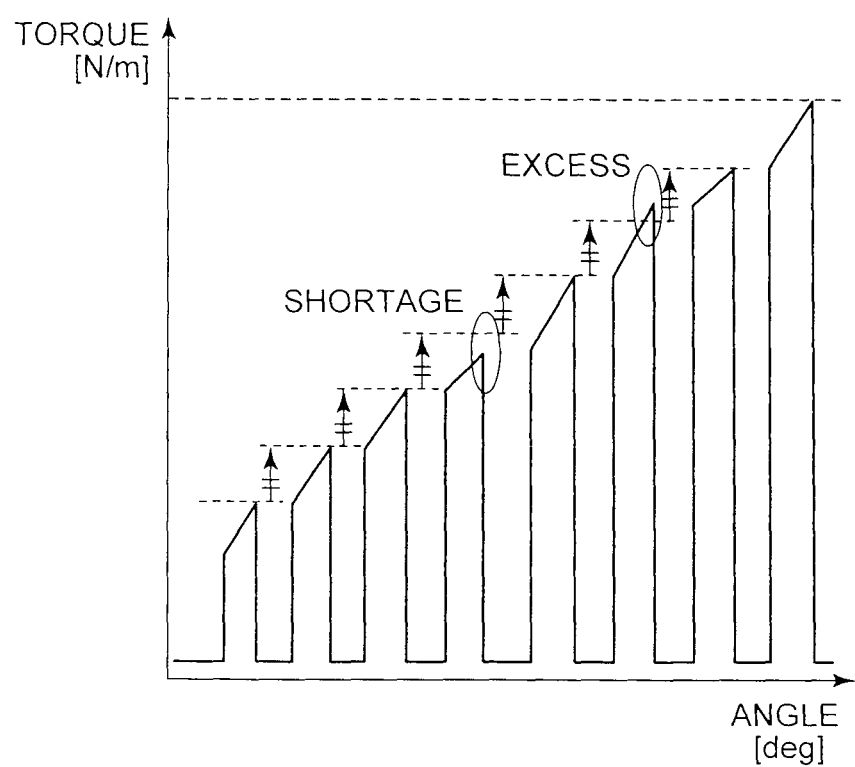
FIG. 4 is a view schematically showing a relation between torque applied to the fastening member after the fastening member abuts on the fastened member, and a rotation angle of the driving motor.

Next, control of the driving motor 5 in the control device 3 is explained. FIG. 3 is a view showing a control flow of the driving motor 5 in the control device 3. FIG. 4 is a view schematically showing a relation between torque applied to the fastening member 8 after the fastening member 8 abuts on the fastened member 10, and a rotation angle of the driving motor 5. Here, a rotation angle of the driving motor 5 corresponds to time, and the relation between torque applied to the fastening member 8 showed in FIG. 4 and a rotation angle of the driving motor 5 is substantially equal to the relation between torque applied to the fastening member 8 and time.

First of all, an initialization pulse, target fastening torque, and an elevated value of torque per pulse, and a pulse interval are set in advance in the control device 3 (S1). As the initialization pulse, the foregoing three elements including the pulse interval are set on the assumption of given rigidity of the fastened member so as to follow an ideal torque curve.

Next, the control device 3 controls the driving motor 5 in order to rotate the driving motor 5 at high speed until the fastening member 8 abuts on the fastened member 10, like common fastening control (S2). Then, once the control device 3 detects that the fastening member 8 abuts on the fastened member 10 based on the detection signal from the torque sensor 7, the control device 3 controls the driving motor 5 based on the initialization pulse that is set in advance (S3).

Next, based on the detection signal from the torque sensor 7, the control device 3 derives last fastening torque applied to the fastening member 8 in the Nth pulse (N is a natural number of 1 or more), and determines whether or not the last fastening torque corresponds to a multiple of the elevated value of torque per pulse that is set in advance (S4).

The multiple is 1 in a case of the first pulse, and 2 in a case of the second pulse. In short, the multiple is N in a case of the Nth pulse.

Therefore, the control device 3 determines whether or not the last fastening torque reached torque that should be reached at the Nth pulse. Here, the torque that should be reached at the Nth pulse is torque at a time that corresponds to falling time of the Nth pulse in the foregoing ideal torque curve.

Next, when the last fastening torque coincides with a value obtained by multiplying the previously-set elevated value of torque per pulse by N (YES in S4), the control device 3 sets pulse strength and pulse loading time for the N+1th pulse without changing the initialization pulse (S5).

Meanwhile, when the last fastening torque is smaller than the value obtained by multiplying the previously-set elevated value of torque per pulse by N (LOW in S4), the control device 3 sets pulse strength and pulse loading time for the N+1th pulse so that the last fastening torque in the N+1th pulse will coincide with a value obtained by multiplying the previously-set elevated value of torque per pulse by N+1 (S6).

In other words, the control device 3 increases either the pulse strength or the pulse loading time in the N+1th pulse compared to the pulse strength and the pulse loading time in the Nth pulse, so that the last fastening torque at the N+1th pulse reaches the torque that should be reached at the N+1th pulse.

For example, in FIG. 4, the last fastening torque at the fourth pulse is smaller than torque that should be reached at the fourth pulse. Therefore, at least either pulse strength or pulse loading time at the fifth pulse is increased so that the last fastening torque at the fifth pulse reaches torque that should be reached at the fifth pulse. Torque indicated by a fine broken line in FIG. 4 is torque that should be reached at each pulse.

At that time, the pulse strength and the pulse loading time are set as appropriate in consideration of the output of the driving motor 5 of the fastening tool 2 and so on. For example, the output of the driving motor 5 is increased so as to obtain given pulse strength, and, when the output of the driving motor 5 nearly reaches its limit, the pulse loading time is extended. At this time, the control device 3 calculates an elevated value of torque per unit time from the detected last fastening torque, and takes the elevated value of torque per unit time into consideration.

On the other hand, when the last fastening torque is greater than the value obtained by multiplying the previously-set elevated value of torque per pulse by N (HIGH in S4), the control device 3 sets pulse strength and the pulse loading time at the N+1th pulse so that the last fastening torque at the N+1th pulse coincides with the value obtained by multiplying the previously-set elevated value of torque per pulse by N+1 (S7).

In other words, the control device 3 decreases either the pulse strength or the pulse loading time in the N+1th pulse compared to the pulse strength and the pulse loading time in the Nth pulse, so that the last fastening torque at the N+1th pulse reaches the torque that should be reached at the N+1th pulse.

For example, in FIG. 4, the last fastening torque at the sixth pulse is greater than torque that should be reached at the sixth pulse. Therefore, at least either pulse strength or pulse loading time at the seventh pulse is decreased so that the last fastening torque at the seventh pulse reaches torque that should be reached at the seventh pulse.

The way to decrease at least either pulse strength and pulse loading time of the N+1th pulse is generally the same as the foregoing way to increase at least either pulse strength and pulse loading time of the N+1th pulse. Therefore, explanation is omitted.

Next, the control device 3 applies torque for the N+1th pulse to the fastening member 8 based on the pulse strength and the pulse loading time that are set for the N+1th pulse, as well as the previously-set pulse interval, and the detection signals from the encoder 4 and the torque sensor 7 (S8).

Then, the control device 3 determines whether or not fastening torque reaches target fastening torque (S9). When the fastening torque does not reach the target fastening torque (NO in S9), the control device 3 returns to the process in S4. When the fastening torque reaches the target fastening torque (YES in S9), the control device 3 ends control of the driving motor 5.

This way, an elevated value of torque in each pulse is feedback-controlled. Therefore, it is possible to set torque strength and pulse loading time for the next pulse so as to realize an optimum torque curve in consideration of an elevated value of torque in each pulse, which varies depending on rigidity of the fastened member 10. Thus, it is possible to contribute to an improvement of fastening accuracy regardless of differences in rigidity of the fastened member 10, and, moreover, a fastening operation is easily done.

Further, since torque strength and pulse loading time are set, which greatly affect fastening accuracy of the fastening member 8 and reaction force while fastening, it is possible to contribute to an improvement of fastening accuracy of the fastening member 8 and a reduction of reaction force while fastening.

In a case where rigidity of the fastened member 10 varies and target fastening torque is the same, the control device 3 sets pulse loading time and torque strength so that time to reach the target fastening torque becomes generally the same. Therefore, an operator is able to fasten the fastening member 8 to the fastened member 10 by using the fastening tool 2 in generally the same time regardless of differences in rigidity of the fastened member 10. Therefore, workability is improved. Moreover, it becomes easy to determine fastening failure of the fastening member 8.

The embodiment of the invention has been explained so far. However, the invention is not limited to the foregoing, and may be changed without departing from the technical idea of the invention.

In the foregoing embodiment, the invention was explained as a structure of a hardware. However, the invention is not limited to this. The invention is able to realize arbitrary processing by causing a CPU (a central processing unit) to execute a computer program.

The program may be stored by using various types of non-transitory computer readable media, and supplied to a computer. The non-transitory computer readable media include various types of tangible storage media. Examples of the non-transitory computer readable media include a magnetic recording media (for example, a flexible disk, a magnetic tape, and a hard disk drive), a magneto optical recording media (for example, a magneto optical disk), a CD-ROM (read only memory), a CD-R, a CD-R/W, a semiconductor memory (for example, a Mask-ROM, a PROM (programmable ROM), an EPROM (erasable PROM), a flash ROM, and a RAM (random access memory)). The program may be supplied to a computer by various types of transitory computer readable media. Examples of the transitory computer readable media include an electric signal, an optical signal, and an electromagnetic wave. The transitory computer readable media is able to supply the program to a computer through a wired communication path such as an electric cable and a optical fiber, or a wireless communication path.

The invention claimed is:

1. A control method of a fastening tool that applies torque to a fastening member in a pulse-like fashion, comprising:
    setting target fastening torque, a pulse interval of neighboring pulses, and an elevated value of torque per pulse;
    detecting last fastening torque at an Nth pulse (N is a natural number of 1 or more) after seating of the fastening member;
    determining whether the last fastening torque at the Nth pulse coincides with a value obtained by multiplying the elevated value of torque per pulse by N;
    setting time for fastening the fastening member at an N+1th pulse, and a value obtained by subtracting a product of the last fastening torque at the Nth pulse and the time for fastening the fastening member at the N+1th pulse, from a time integrated value of torque applied to the fastening member at the N+1th pulse, based on the last fastening torque at the Nth pulse so that last fastening torque at the N+1th pulse coincides with a value obtained by multiplying the elevated value of torque per pulse by N+1 in response to the last fastening torque at the Nth pulse being determined not to coincide with the value obtained by multiplying the elevated value of torque per pulse by N; and controlling the fastening tool based on the pulse interval, the time for fastening the fastening member at the N+1th pulse, the value obtained by subtracting the product of the last fastening torque at the Nth pulse and the time for fastening the fastening member at the N+1th pulse, from the time integrated value of torque applied to the fastening member at the N+1th pulse, so as to allow last fastening torque at an N+Mth pulse (M is a natural number of 1 or more) to reach the target fastening torque which coincides with a value obtained by multiplying the elevated value of torque per pulse by N+M.

2. The control method according to claim 1, wherein, in a case where rigidity of a fastened member, to which the fastening member is fastened, is varied, and the target fastening torque is the same, the time for fastening the fastening member at the N+1th pulse, and the value obtained by subtracting the product of the last fastening torque at the Nth pulse and the time for fastening the fastening member at the N+1th pulse, from the time integrated value of torque applied to the fastening member at the N+1th pulse, are set so that time to reach the target fastening torque is equalized for the varied rigidity of the fastened member at the same target fastening torque.

3. A control device of a fastening tool that applies torque to a fastening member in a pulse-like fashion, comprising:

a control part configured to set time for fastening the fastening member at an N+1th pulse, and a value obtained by subtracting a product of last fastening torque at an Nth pulse and the time for fastening the fastening member at the N+1th pulse, from a time integrated value of torque applied to the fastening member at the N+1th pulse, based on the last fastening torque at an Nth pulse so that last fastening torque at the N+1th pulse coincides with a value obtained by multiplying a previously-set elevated value of torque per pulse by N+1, and target fastening torque is reached with a previously-set pulse interval of neighboring pulses.

* * * * *